(12) United States Patent
Blue et al.

(10) Patent No.: US 11,377,090 B2
(45) Date of Patent: Jul. 5, 2022

(54) SYSTEM FOR CONTROLLING AN ENGINE DISCONNECT CLUTCH IN A HYBRID VEHICLE

(71) Applicant: FORD GLOBAL TECHNOLOGIES, LLC, Dearborn, MI (US)

(72) Inventors: Corey James Blue, Belleville, MI (US); Minku Lee, Ypsilanti, MI (US); Scott James Thompson, Canton, MI (US); Bradley Dean Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 334 days.

(21) Appl. No.: 16/706,022

(22) Filed: Dec. 6, 2019

(65) Prior Publication Data

US 2021/0171014 A1    Jun. 10, 2021

(51) Int. Cl.
| | |
|---|---|
| *B60W 20/40* | (2016.01) |
| *B60W 10/02* | (2006.01) |
| *B60W 10/08* | (2006.01) |
| *B60W 10/11* | (2012.01) |
| *B60W 10/06* | (2006.01) |

(52) U.S. Cl.
CPC .......... *B60W 20/40* (2013.01); *B60W 10/023* (2013.01); *B60W 10/026* (2013.01); *B60W 10/06* (2013.01); *B60W 10/08* (2013.01); *B60W 10/11* (2013.01); *B60W 2510/06* (2013.01); *B60W 2510/081* (2013.01); *B60W 2710/024* (2013.01); *B60W 2710/30* (2013.01)

(58) Field of Classification Search
CPC ......... B60W 2710/30; B60W 2510/06; B60W 20/40; B60W 10/02; B60W 310/06; B60W 10/08; B60W 2510/081; B60W 10/30; B60W 2710/021; B60W 2710/022
USPC .......................................................... 477/5
See application file for complete search history.

(56) References Cited

U.S. PATENT DOCUMENTS

| | | | |
|---|---|---|---|
| 9,296,380 B2 | 3/2016 | Ortmann et al. | |
| 9,545,908 B2 | 1/2017 | Doering et al. | |
| 9,610,940 B2 | 4/2017 | Ortmann et al. | |
| 2015/0291144 A1* | 10/2015 | Ortmann | B60K 6/387 |
| | | | 477/5 |

(Continued)

FOREIGN PATENT DOCUMENTS

DE    102013103878 A1 *  10/2014  ............. F16D 48/06

*Primary Examiner* — Roger L Pang
(74) *Attorney, Agent, or Firm* — David B Kelley; Brooks Kushman P.C.

(57) ABSTRACT

A vehicle includes an engine having a crankshaft, an electric machine having a rotor, a disconnect clutch having an input secured to the crankshaft and an output secured to the rotor, a hydraulic pump mechanically powered via rotation of the rotor and configured to supply hydraulic fluid to the actuate the disconnect clutch, a torque converter having an impeller secured to the rotor, and controller. The controller is programmed to, responsive to a speed of the impeller decreasing to less than a first threshold, which is indicative of a subsequent shutdown of the hydraulic pump, and responsive to the disconnect clutch being open while the engine is shut down, advance the disconnect clutch to a touch point where opposing sides of disconnect clutch make contact but substantially zero power is transferred between the engine and the electric machine.

16 Claims, 2 Drawing Sheets

(56) References Cited

U.S. PATENT DOCUMENTS

| | | | | |
|---|---|---|---|---|
| 2016/0107633 A1* | 4/2016 | Liang | ................... | B60W 10/115 |
| | | | | 701/22 |
| 2018/0022353 A1* | 1/2018 | Thompson | .............. | F02N 11/04 |
| | | | | 701/22 |
| 2020/0262412 A1* | 8/2020 | Baba | ................... | B60W 10/023 |

* cited by examiner

SYSTEM FOR CONTROLLING AN ENGINE DISCONNECT CLUTCH IN A HYBRID VEHICLE

TECHNICAL FIELD

The present disclosure relates to hybrid vehicles and control systems for hybrid vehicles.

BACKGROUND

Hybrid vehicles may include both an internal combustion engine and an electric machine that are each configured to propel the vehicle.

SUMMARY

A vehicle includes an engine, and electric machine, a disconnect clutch, a step-ratio transmission, a torque converter, a primary hydraulic pump, and a controller. The engine and the electric machine are each configured to deliver power to at least one drive wheel. The disconnect clutch is disposed between the engine and the electric machine. The step-ratio transmission is disposed between the electric machine and the at least one drive wheel. The torque converter has an impeller and is disposed between the electric machine and the step-ratio transmission. The primary hydraulic pump is mechanically powered via rotation of electric machine and is configured to supply hydraulic fluid to actuate the disconnect clutch and a plurality of clutches within the step-ratio transmission. The controller is programmed to, responsive to a speed of the impeller decreasing to less than a first threshold, which is indicative of a subsequent shutdown of the hydraulic pump, and responsive to the disconnect clutch being open while the engine is shut down, operate the primary hydraulic pump to advance the disconnect clutch to a touch point where opposing sides of disconnect clutch make contact but substantially zero power is transferred between the engine and the electric machine.

A vehicle includes an engine having a crankshaft, an electric machine having a rotor, a disconnect clutch having an input secured to the crankshaft and an output secured to the rotor, a hydraulic pump mechanically powered via rotation of the rotor and configured to supply hydraulic fluid to the actuate the disconnect clutch, a torque converter having an impeller secured to the rotor, and controller. The controller is programmed to, responsive to a speed of the impeller decreasing to less than a first threshold, which is indicative of a subsequent shutdown of the hydraulic pump, and responsive to the disconnect clutch being open while the engine is shut down, advance the disconnect clutch to a touch point where opposing sides of disconnect clutch make contact but substantially zero power is transferred between the engine and the electric machine.

A vehicle includes a powertrain, a disconnect clutch, a hydraulic pump, and a controller. The powertrain has an engine and an electric machine that are each configured to generate power. The disconnect clutch is disposed between the engine and electric machine. The hydraulic pump is mechanically powered via rotation of the electric machine and is configured to supply hydraulic fluid to the actuate the disconnect clutch. The controller is programmed to, responsive to a speed of a rotor of the electric machine decreasing to less than a first threshold, which is indicative of a subsequent shutdown of the hydraulic pump, and responsive to the disconnect clutch being open while the engine is shut down, advance the disconnect clutch to a touch point where opposing sides of disconnect clutch make contact but substantially zero power is transferred between the engine and the electric machine.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
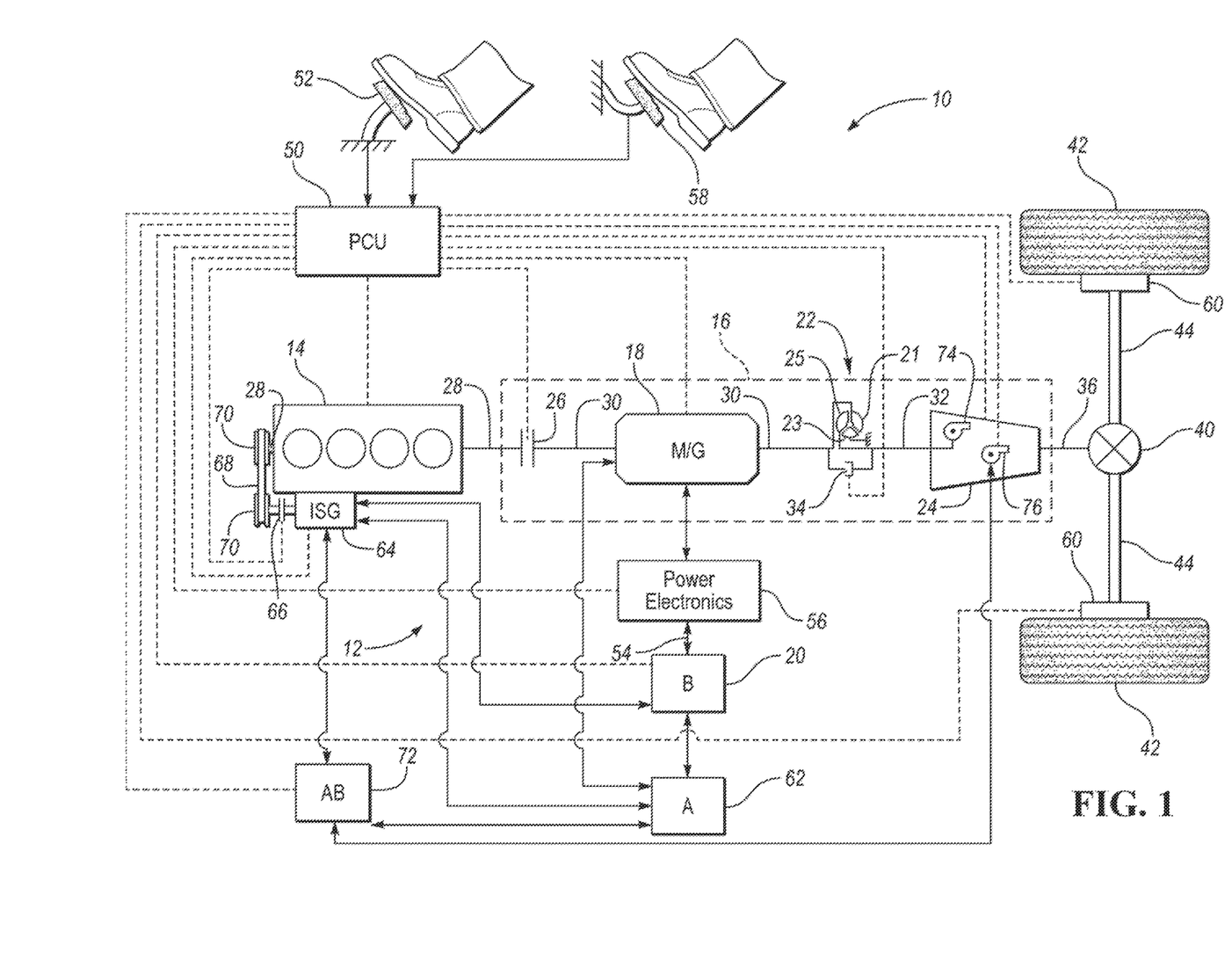
FIG. 1 is a schematic illustration of a representative powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. The M/G 18 may include a stator that is rigidly fixed to a static component such as a housing and a rotor that is configured to rotate to transfer the power generated by the M/G 18. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. M/G shaft 30 is secured to and is configured to rotate with the rotor of the MG 18. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged. The disconnect clutch 26 may be a normally open clutch that is biased into an open and disconnected position via spring when hydraulic pressure is not being delivered to the disconnect clutch 26.

The M/G 18 is connected to the torque converter 22 via shaft 30. The torque converter 22 is therefore connected to the engine 14 when the disconnect clutch 26 is at least partially engaged. The torque converter 22 includes an impeller 21 (which may be fixed to M/G shaft 30), a stator 23, and a turbine 25 (which may be fixed to a transmission input shaft 32). The torque converter 22 thus provides a hydraulic coupling between shaft 30 and transmission input shaft 32. Internally, The torque converter 22 transmits power from the impeller 21 to the turbine 25 when the impeller 21 rotates faster than the turbine 25. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator.

The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The SG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

The transmission 16 may include a primary hydraulic pump 74 that is mechanically powered via rotation of the M/G 18. More specifically, the impeller of the primary hydraulic pump 74 may be connected directly to the M/G shaft 30 or may be indirectly connected to the M/G shaft 30 via the transmission input shaft 32 and any intermediate components that may be between the M/G shaft 30 and the transmission input shaft 32 (e.g., the torque converter 22 or a launch clutch for applications that do not include a torque converter 22). The primary hydraulic pump 74 is configured to supply hydraulic fluid to valves (not show) to the actuate the disconnect clutch 26 and a plurality of clutches within the step-ratio transmission or gearbox 24.

The transmission 16 may include an electrically powered secondary hydraulic pump 76. The impeller of secondary hydraulic pump 76 may be connected to an electric motor (not shown) that draws power from the accessory battery 72 in order rotate the impeller of the secondary hydraulic pump 76. The secondary hydraulic pump 76 is also configured to supply hydraulic fluid to valves (not show) to the actuate the disconnect clutch 26 and a plurality of clutches within the step-ratio transmission or gearbox 24.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other non-hybrid, electric, or hybrid vehicle configurations should be construed as disclosed herein.

Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

When HEV 10 comes to a stop, the speed of the impeller of the primary hydraulic pump 74 and the speed of the M/G 18, or more specifically the speed of the rotor of the M/G 18, will go to zero to save energy and improve fuel economy. Since the impeller of the primary hydraulic pump 74 is driven by the M/G 18, during creep cancel events (i.e., and event where the HEV 10 comes to a stop), the hydraulic flow out of the primary hydraulic pump 74 will drop to zero making it difficult to apply or control the disconnect clutch 26 and the plurality of clutches within the step-ratio transmission (or gearbox 24) with the primary hydraulic pump 74.

When the driver tips into (i.e., depresses) the accelerator pedal ending the creep cancel event, an engine pull up or an engine start may be requested. This means that the disconnect clutch 26 will need to be applied to connect the engine 14 to the impeller of the primary hydraulic pump 74. However, since the disconnect clutch 26 cannot begin to apply before the primary hydraulic pump 74 supplies adequate flow, the disconnect clutch 26 may be late in closing, causing a lurch or surge during the engine start which may decrease drivability, decrease fuel economy, and increase emissions. The surge may be caused by the M/G 18 speeding up quickly to meet driver demand and if driver demand is greater than what the M/G 18 is able to supply, the torque output of M/G 18 may reach a maximum output before the disconnect clutch 26 is closed. Under such a circumstance the powertrain 12 may not be able to output the driver demanded torque, and when the engine 14 does become connected, there may be a quick increase in torque from the engine 14, which in turn would cause a large and quick increase in powertrain torque. To improve the drivability during such an engine start, the disconnect clutch 26 may be stroked to a touch point where opposing sides of disconnect clutch 26 begin to make contact but where substantially zero power is transferred between the engine 14 and the M/G 18 in order to get the disconnect clutch 26 past its hydraulic stroke so that the disconnect clutch 26 can respond quickly to torque requests.

Getting the disconnect clutch 26 past hydraulic stroke so it can respond to torque requests requires boosting the clutch which takes time. This time includes waiting on the line pressure to get to the desired pressure level, which is based off the flow from the primary hydraulic pump 74. During an engine start there is not much time to wait on the disconnect clutch 26 to get into position, so stroking the clutch before the engine pull up decreases the time of the engine start and connection. Decreasing an engine start time improves drivability because the engine 14 becomes connected to the driveline and the operator of the HEV 10 has access to the engine power for propelling the HEV 10 in a timelier manner. Decreasing an engine start time also reduces emissions and increases fuel economy because the engine 14 spends less time running while not be connected to the driveline. With this logic, the engine start time is decreased so that the connection of the engine 14 to the remainder powertrain 12 via the disconnect clutch 26 will occur before the M/G 18 torque output reaches a maximum. This means the M/G 18 will have sufficient torque capacity at the time of connection to meet driver demand. Previously during such events, it was difficult for the disconnect clutch 26 to assist the engine 14 with running up to the target speed during the start because it would only be ready after the engine 14 gets to the target speed. Now that the disconnect clutch 26 is prepared before the engine start is requested it can also assist with running the engine up to the target speed by utilizing the torque capacity out of the clutch, and the M/G 18 may further decrease the amount of fuel needed to get the engine up to target speed during the engine start.

Figure 2:
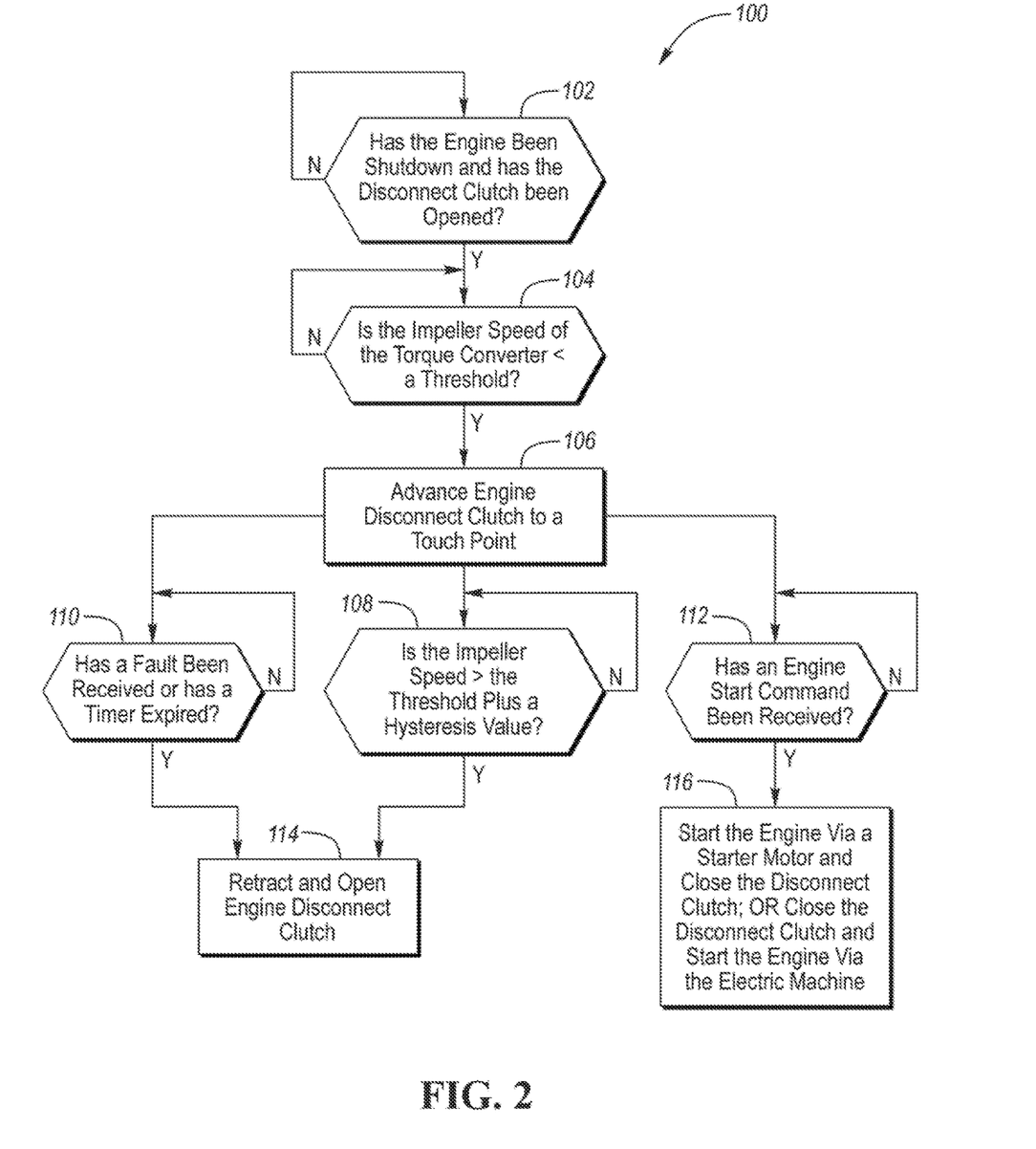
FIG. 2 is a flowchart illustrating a method for controlling the engine disconnect clutch the in the hybrid electric vehicle.

Referring to FIG. 2, a flowchart of a method 100 for controlling the engine disconnect clutch 26 in the hybrid electric vehicle 10 is illustrated. The method 100 may be stored as control logic and/or an algorithm within the controller 50. The controller 50 may implement the method 100 by controlling the various components of the vehicle 10. The method 100 begins at block 102 where it is determined if the engine 14 has been shut down and if the disconnected clutch 26 has been opened to disconnect the engine 14 from the remainder of the powertrain 12. If the engine 14 has not been shut down and the disconnect clutch 26 has not been opened, the method 100 recycles back to the beginning of block 102. If the engine 14 has been shut down and the disconnected clutch 26 has been opened, the method 100 moves on to block 104.

At Block 104 it is determined if the speed of the impeller 21 of the torque converter 22 is less than a threshold, which is indicative of an impending or subsequent shutdown of the primary hydraulic pump 74 where the speed of the impeller of the primary hydraulic pump 74 will be zero. The threshold described in block 104 may also be referred to as a first threshold. If the speed of the impeller 21 of the torque converter 22 is not less than the threshold, the method 100 recycles back to the beginning of block 104. If the speed of the impeller 21 of the torque converter 22 is less than the threshold, the method 100 moves on to block 106 where the disconnect clutch 26 is stroked and advanced to a touch point where opposing sides of disconnect clutch 26 begin to make contact but where substantially zero power is transferred between the engine 14 and the M/G 18. Substantially zero power may refer to any incremental value that ranges between 0 and 5 Watts. The primary hydraulic pump 74 is operated during the step at block 106 to provide the hydraulic fluid and pressure to advance the disconnected clutch 26 to the touch point prior to the impending or subsequent shutdown, after which the primary hydraulic pump 74 would be unable to supply hydraulic fluid and pressure to the disconnect clutch 26.

It should be noted that at block 104, the method 100 alternatively may determine whether or not a speed of the rotor of the M/G 18 is less than a threshold as opposed to the speed of the impeller 21 of the torque converter 22, which is also indicative of an impending or subsequent shutdown of the primary hydraulic pump 74 where the speed of the impeller of the primary hydraulic pump 74 will be zero. If the speed of the rotor of the M/G 18 is not less than the threshold, the method 100 would recycle back to the beginning of block 104. If the speed of the rotor of the M/G 18 is less than the threshold, the method 100 would move on to block 106.

Once the disconnect clutch 26 has been advanced to the touch point, the method 100 moves on to decision blocks 108, 110, and 112. At decision block 108 it is determined if the speed of the impeller 21 of the torque converter 22 has increased to a value that is greater than the threshold determined at block 104 plus a hysteresis value. The threshold determined at block 104 plus the hysteresis value may be referred to as a second threshold, which is greater than the first threshold (i.e., the threshold determined at block 104). If the speed of the impeller 21 is not greater than the threshold determined at block 104 plus the hysteresis value, the method 100 recycles back to the beginning of block 108 where the position of the disconnect clutch 26 is maintained at the touch point. If the speed of the impeller 21 is greater than the threshold determined at block 104 plus the hysteresis value, the method 10 moves on to block 114 where the disconnect clutch 26 is retracted and opened. The disconnect clutch 26 is retracted and opened at block 114 because the increase in the speed of the impeller 21 is indicative that an impending or subsequent shutdown of the primary hydraulic pump 74 no longer exists.

It should be noted that at block 108, the method 100 alternatively may determine whether or not a speed of the rotor of the M/G 18 has increased to a value (i.e., the second threshold) that is greater than the threshold determined at block 104 plus the hysteresis value. If the speed of the rotor of the M/G 18 is not greater than the threshold determined at block 104 plus the hysteresis value, the method 100 recycles back to the beginning of block 108 where the position of the disconnect clutch 26 is maintained at the touch point. If the speed of the rotor of the M/G 18 is greater than the threshold determined at block 104 plus the hysteresis value, the method 100 moves on to block 114 where the disconnect clutch 26 is retracted and opened.

At decision block 110 it is determined if the controller 50 has received a signal indicative of a disconnect clutch fault while the disconnect clutch 26 is at the touch point and while the speed of the impeller 21 or the speed of the rotor of the M/G 18 remains below the threshold determined at block 104 plus the hysteresis value, or if a timer has expired after the disconnect clutch 26 was advanced to the touch point while the speed of the impeller 21 or the speed of the rotor of the M/G 18 remains below the threshold determined at block 104 plus the hysteresis value. The timer may be initiated once the disconnect clutch 26 is advanced to the touch point. If the controller 50 has not received a signal indicative of a disconnect clutch fault and if the timer has not expired after the disconnect clutch 26 was advanced to the touch point, while the speed of the impeller 21 or the speed of the rotor of the M/G 18 remains below the threshold determined at block 104 plus the hysteresis value, the method 100 recycles back to the beginning of block 110 where the position of the disconnect clutch 26 is maintained at the touch point. If the controller has received a signal indicative of a disconnect clutch fault or if the timer has expired after the disconnect clutch 26 was advanced to the touch point, while the speed of the impeller 21 or the speed of the rotor of the M/G 18 remains below the threshold determined at block 104 plus the hysteresis value, the method 100 moves on to block 114 where the disconnect clutch 26 is retracted and opened.

At decision block 112 it is determined if an engine start command has been received by the controller 50. If an engine start command has not been received by the controller 50, the method 100 recycles back to the beginning of block 112 where the position of the disconnect clutch 26 is maintained at the touch point. If an engine start command has been received by the controller 50, the method 100 moves on to block 116. At block 116 the engine 14 may be started via a starter motor (e.g., ISG 64) or via the M/G 18. If the command is to start the engine 14 via the starter motor, the starter motor (e.g., ISG 64) starts the engine, the M/G 18 increases the speed of the impeller (or the speed of the rotor of the M/G 18) to greater than the threshold determined at block 104 in order to increase the speed of impeller of the primary hydraulic pump 74, and the primary hydraulic pump 74 is subsequently operated to deliver hydraulic fluid and pressure to advance and close the disconnect clutch 26 to transfer power between the engine 14 and the M/G 18. If the command is to start the engine 14 via the M/G 18 while the disconnect clutch is at the touch point and the speed of the impeller (or the speed of the rotor of the M/G 18) is less than the threshold determined at block 104, the secondary hydraulic pump 76 may be operated to deliver hydraulic fluid and pressure to advance and close the disconnect clutch 26 to transfer power between the engine 14 and the M/G 18. It should be understood that the flowchart in FIG. 2 is for illustrative purposes only and that the method 100 should not be construed as limited to the flowchart in FIG. 2. Some of the steps of the method 100 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or mom features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an engine and an electric machine each configured to deliver power to at least one drive wheel;
   a disconnect clutch disposed between the engine and the electric machine;
   a step-ratio transmission disposed between the electric machine and the at least one drive wheel;
   a torque converter having an impeller and disposed between the electric machine and the step-ratio transmission;
   a primary hydraulic pump mechanically powered via rotation of electric machine and configured to supply hydraulic fluid to actuate the disconnect clutch and a plurality of clutches within the step-ratio transmission; and
   a controller programmed to, responsive to a speed of the impeller decreasing to less than a first threshold, which is indicative of a subsequent shutdown of the hydraulic pump, and responsive to the disconnect clutch being open while the engine is shut down, operate the primary hydraulic pump to advance the disconnect clutch to a touch point where opposing sides of disconnect clutch make contact but substantially zero power is transferred between the engine and the electric machine.

2. The vehicle of claim 1, wherein the controller is further programmed to, responsive to the speed of the impeller increasing to greater than a second threshold while the disconnect clutch is at the touch point and the engine is shut down, retract and open the disconnect clutch.

3. The vehicle of claim 2, wherein the controller is further programmed to, responsive to the speed of the impeller increasing to greater than the first threshold but less than the second threshold while the disconnect clutch is at the touch point and the engine is shut down, maintain the position of the disconnect clutch at the touch point.

4. The vehicle of claim 2, wherein the second threshold is greater than the first threshold.

5. The vehicle of claim 2, wherein the controller is further programmed to, responsive to receiving a disconnect clutch fault while the disconnect clutch is at the touch point, the engine is shut down, and the impeller speed is less than the second threshold, retract and open the disconnect clutch.

6. The vehicle of claim 2, wherein the controller is further programmed to, responsive to the expiration of a timer after advancing the disconnect clutch to the touch point while the impeller speed remains below the second threshold, retract and open the disconnect clutch.

7. The vehicle of claim 1 further comprising a starter motor configured to start the engine, wherein the controller is further programmed to, responsive to an engine start via the starter motor while the disconnect clutch is at the touch point, operate the electric machine to increase the speed of the impeller to greater than the first threshold and subsequently operate the primary hydraulic pump to advance and close the disconnect clutch to transfer power between the engine and the electric machine.

8. The vehicle of claim 1 further comprising an electrically powered secondary hydraulic pump that is configured to supply hydraulic fluid to actuate the disconnect clutch, wherein the controller is further programmed to, responsive to a command to start the engine via the electric machine while the disconnect clutch is at the touch point and impeller speed is below the first threshold, operate the secondary hydraulic pump to further advance and close the disconnect clutch to transfer power between the engine and the electric machine.

9. A vehicle comprising:
   an engine having a crankshaft;
   an electric machine having a rotor;
   a disconnect clutch having an input secured to the crankshaft and an output secured to the rotor;
   a hydraulic pump mechanically powered via rotation of the rotor and configured to supply hydraulic fluid to actuate the disconnect clutch;
   a torque converter having an impeller secured to the rotor; and
   a controller programmed to,
      responsive to a speed of the impeller decreasing to less than a first threshold, which is indicative of a subsequent shutdown of the hydraulic pump, and responsive to the disconnect clutch being open while the engine is shut down, advance the disconnect clutch to a touch point where opposing sides of disconnect clutch make contact but substantially zero power is transferred between the engine and the electric machine, and
      responsive to the speed of the impeller increasing to greater than a second threshold while the disconnect clutch is at the touch point and the engine is shut down, retract and open the disconnect clutch, wherein the second threshold is greater than the first threshold.

10. The vehicle of claim 9, wherein the controller is further programmed to, responsive to the speed of the impeller increasing to greater than the first threshold but less than the second threshold while the disconnect clutch is at the touch point and the engine is shut down, maintain the position of the disconnect clutch at the touch point.

11. The vehicle of claim 9, wherein the controller is further programmed to, responsive to receiving a disconnect clutch fault while the disconnect clutch is at the touch point, the engine is shut down, and the impeller speed is less than the second threshold, retract and open the disconnect clutch.

12. The vehicle of claim 9, wherein the controller is further programmed to, responsive to the expiration of a timer after advancing the disconnect clutch to the touch point while the impeller speed remains below the second threshold, retract and open the disconnect clutch.

13. A vehicle comprising:
   a powertrain having an engine and an electric machine each configured to generate power;
   a disconnect clutch disposed between the engine and electric machine;
   a hydraulic pump mechanically powered via rotation of the electric machine and configured to supply hydraulic fluid to actuate the disconnect clutch; and
   a controller programmed to,
      responsive to a speed of a rotor of the electric machine decreasing to less than a first threshold, which is indicative of a subsequent shutdown of the hydraulic pump, and responsive to the disconnect clutch being open while the engine is shut down, advance the disconnect clutch to a touch point where opposing sides of disconnect clutch make contact but substantially zero power is transferred between the engine and the electric machine, and
      responsive to the speed of the rotor increasing to greater than a second threshold while the disconnect clutch is at the touch point and the engine is shut down, retract and open the disconnect clutch, wherein the second threshold is greater than the first threshold.

14. The vehicle of claim 13, wherein the controller is further programmed to, responsive to the speed of the rotor increasing to greater than the first threshold but less than the second threshold while the disconnect clutch is at the touch point and the engine is shut down, maintain the position of the disconnect clutch at the touch point.

15. The vehicle of claim 13, wherein the controller is further programmed to, responsive to receiving a disconnect clutch fault while the disconnect clutch is at the touch point, the engine is shut down, and the rotor speed is less than the second threshold, retract and open the disconnect clutch.

16. The vehicle of claim 13, wherein the controller is further programmed to, responsive to the expiration of a timer after advancing the disconnect clutch to the touch point while the rotor speed remains below the second threshold, retract and open the disconnect clutch.

* * * * *